United States Patent Office 2,819,297
Patented Jan. 7, 1958

2,819,297

INTERMEDIATES FOR THE PREPARATION OF ASYMMETRICAL C$_{40}$ CAROTENOIDS

Otto Isler, Marc Montavon, and Rudolf Rüegg, Basel, Switzerland, and Paul Zeller, Neuallschwil, near Basel, Switzerland, assignors to Hoffmann-La Roche Inc., Nutley, N. J., a corporation of New Jersey No Drawing. Application July 16, 1956
Serial No. 597,901

Claims priority, application Switzerland July 22, 1955

4 Claims. (Cl. 260—488)

The present invention relates to a process for the manufacture of carotenoids. This process comprises condensing acetylene by metal-organic reaction, on the one hand, with 8 - [2,6,6 - trimethyl - 1 - cyclohexen - 1 - yl]- or 8 - [2,6,6 - trimethyl - cyclohexyliden] - 2,6 - dimethyl-2,4,6-octatrien-1-al [hereinafter referred to as β- and iso-C$_{19}$-aldehyde, respectively] and, on the other hand, with an 8-[2,6,6-trimethyl-1-cyclohexen-1-yl]- or 8-[2,6,6 - trimethyl - cyclohexyliden] - 2,6 - dimethyl - 2,4,6-octatrien-1-al carrying a free or esterified hydroxy group in the 4-position of the nucleus [hereinafter referred to as substituted β- and iso-C$_{19}$-aldehyde, respectively], subjecting the resulting 1,18-di-[2,6,6-trimethyl-1-cyclohexen-1-yl]- or 1,18-di-[2,6,6-trimethylcyclohexyliden]-3,7, 12,16 - tetramethyl - 8,11 - dihydroxy - 2,4,6,12,14,16-octadecahexaen - 9 - yne carrying a free or esterified hydroxy group in the 4-position of one of the nuclei [hereinafter referred to as β- and iso-C$_{40}$-diol, respectively], if desired after esterification thereof, to a treatment causing splitting off of two molecules of water or acid and allyl rearrangement, and, if desired, to an alkaline saponification.

The starting C$_{19}$-aldehydes can be prepared e. g. as follows:

8 - [2,6,6 - trimethyl - cyclohexyliden] - 2,6 - dimethyl-2,4,6 - octatrien - 1 - al [hereinafter referred to as iso-C$_{19}$-aldehyde]

The ethoxy-acetylene carbinol obtained by condensing ethoxy-acetylene with 2,6,6-trimethyl-1-cyclohexanone is partially hydrogenated at the triple bond in a manner known per se and treated with acid, the resulting 2,6,6-trimethyl - cyclohexyliden - acetaldehyde is acetalised with ethyl ortho-formate, the acetal is condensed with propenyl ethyl ether in the presence of an acidic condensing agent, and the condensation product is hydrolysed with acetic acid. The resulting 4-[2,6,6-trimethyl-cyclohexyliden] - 2 - methyl - 2 - buten - 1 - al is acetalised in the same manner, the acetal is condensed with vinyl ethyl ether, the condensation product is hydrolysed with acetic acid, the resulting 6 - [2,6,6 - trimethyl - cyclohexyliden]-4 - methyl - 2,4 - hexadien - 1 - al is acetalised, the acetal is condensed with propenyl ethyl ether, and the condensation product is hydrolysed with acetic acid. The thus obtained 8 - [2,6,6 - trimethyl - cyclohexyliden] - 2,6-dimethyl-2,4,6-octatrien-1-al has U. V. absorption maxima at 334, 356 and 376 mµ. (in petroleum ether solution).

8 - [2,6,6 - trimethyl - 4 - acetoxy - cyclohexyliden] - 2,6-dimethyl-2,4,6-octatrien-1-al By reacting β-isophorone with peracetic acid there is obtained hydroxy-isophorone which, upon oxidation with chromic acid, yields 2,6,6-trimethyl-2-cyclohexen-1,4-dione. By reducing the latter with zinc in glacial acetic acid there is obtained 2,6,6-trimethyl-1,4-cyclohexanedione which is then ketalised at the keto group in 4-position by means of ethylene glycol and p-toluenesulphonic acid. The mono-ketal is reacted with the lithium salt of 3-methyl-3-hydroxy-4-methoxy-1-butyne (prepared by introducing 3 - methyl - 3 - hydroxy - 4 -methoxy - 1 - butyne into a lithium amide suspension obtained from lithium and liquid ammonia) to form 4-[2,6,6-trimethyl-4-ethylenedioxy - 1 - hydroxy - 1 - cyclohexyl] - 2 - methyl-2 - hydroxy - 1 - methoxy - 3 - butyne which is partially hydrogenated at the triple bond, boiled with formic acid and treated with glacial acetic acid and sodium acetate to form 4 - [2,6,6 - trimethyl - 4 - oxo - cyclohexyliden]-2-methyl-2-buten-1-al. By acetalisation of the latter with ethyl ortho-formate in the presence of ortho-phosphoric acid and a small amount of p-toluenesulphonic acid, reduction of the formed acetal with lithium-aluminum hydride and acetylation with acetic anhydride in the presence of pyridine there is obtained 4-[2,6,6-trimethyl-4-acetoxy - cyclohexyliden] - 2 -methyl - 2 - buten - 1-acetal which, upon condensation with vinyl ether in the presence of zinc chloride and hydrolysis with acetic acid and sodium acetate, yields 6-[2,6,6-trimethyl-4-acetoxy-cyclohexyliden] - 4 - methyl - 2,4 - hexadien- 1 - al. By acetalisation of the latter with ethyl ortho-formate in the presence of ortho-phosphoric acid and a small amount of p-toluenesulphonic acid, condensation of the resulting acetal with propenyl ether in the presence of zinc chloride and hydrolysis of the condensation product with acetic acid and sodium acetate there is obtained 8-[2,6,6-trimethyl - 4 - acetoxy - cyclohexyliden] - 2,6 - dimethyl-2,4,6-octatrien-1-al in the form of a yellow tough resin; U. V. absorption maxima at 338, 354 and 372 mµ. (in petroleum ether solution).

8 - [2,6,6 - trimethyl - 4 - hydroxy - cyclohexyliden] - 2,6-dimethyl-2,4,6-octatrien-1-al This compound is obtained by boiling 8-[2,6,6-trimethyl - 4 - acetoxy - cyclohexyliden] - 2,6 - dimethyl - 2,4,6-octatrien-1-al with sodium bicarbonate in 90% methanol, The thus obtained product has U. V. absorption maxima at 338, 354 and 372 mµ. (in petroleum ether solution).

8 - [2,6,6 - trimethyl - 4 - acetoxy - 1 - cyclohexen - 1 - yl]-2,6-dimethyl-2,4,6-octatrien-1-al 4 - [2,6,6 - trimethyl - 4 - oxo - cyclohexyliden] - 2-methyl - 2 - buten - 1 - al is acetalised, reduced by means of lithium-aluminum hydride, and hydrolysed with acetic acid. The resulting 4 - [2,6,6 - trimethyl - 4 - acetoxy-cyclohexyliden] - 2 - methyl - 2 -buten - 1 - al is converted into the enol acetate by means of isopropenyl acetate, and the enol acetate is subjected to alkaline saponification and acetylated to form 4-[2,6,6-trimethyl-4-acetoxy - 1 - cyclohexen - 1 - yl] - 2 - methyl - 2 - buten - 1-al. By acetalising the latter, condensing with vinyl ether and hydrolysing with acetic acid there is obtained 6-[2,6, 6 - trimethyl - 4 - acetoxy - 1 - cyclohexen - 1 - yl] - 4-methyl - 2,4 - hexadien - 1 - al which, upon acetalisation, condensation with propenyl ether and hydrolysis with acetic acid, yields 8-[2,6,6-trimethyl-4-acetoxy-1-cyclohexen - 1 - yl] - 2,6 - dimethyl - 2,4,6 - octatrien - 1-al.

8 - [2,6,6 - trimethyl - 4 - hydroxy - 1 - cyclohexen - 1 - yl]-2,6-dimethyl-2,4,6-octatrien-1-al This compound is obtained by boiling 8[2,6,6-trimethyl - 4 - acetoxy - 1 - cyclohexen - 1 - yl] - 2,6 - dimethyl-2,4,6-octatrien-1-al with sodium bicarbonate in 90% methanol. The thus obtained product has an U. V. absorption maximum at 312 mµ in petroleum ether solution.

According to one mode of carrying out the first step of the process of the present invention the β- or iso-$C_{19}$-aldehyde is reacted in liquid ammonia with an alkali or alkaline earth metal acetylide, and the resulting condensation product, preferably after having been hydrolysed to 10-[2,6,6-trimethyl-1-cyclohexene-1-yl]- or 10-[2,6,6-trimethyl-cyclohexyliden]-4,8-dimethyl - 4,6,8 - decatrien-1-yne-3-ol [hereinafter referred to as β- and iso-$C_{21}$-acetylene carbinol, respectively] is reacted by a metal-organic reaction with the substituted β- or iso-$C_{19}$-aldehyde. The condensation in liquid ammonia can be carried out at elevated pressure and at room temperature or at normal atmospheric pressure and at the boiling temperature of ammonia. The $C_{19}$-aldehyde is preferably condensed with lithium acetylide which can be prepared from lithium metal and acetylene prior to the reaction in the same vessel and in the same ammonia as used for the condensation. The $C_{19}$-aldehyde can be added in an inert solvent, such as ether. The hydrolysis of the condensation product may be effected in liquid ammonia by adding an ammonium salt or after removal of the ammonia by treatment with acid. The β- and iso-$C_{21}$-acetylene carbinols are viscous oils. They have 1 mole of active hydrogen atoms in the cold and 2 moles of active hydrogen atoms at elevated temperature as determined by the method of Zerewitinoff. In the U. V. spectrum they possess characteristic absorption maxima. The condensation of the β- or iso-$C_{21}$-acetylene carbinol with the substituted $C_{19}$-aldehyde is effected by a metal-organic reaction which is effected, e. g., by subjecting the $C_{21}$-acetylene carbinol to the action of 2 moles of alkyl-magnesium halide or 2 moles of phenyllithium in an inert solvent. The first mole of the metal organic compound is attached to the hydroxyl group whereas the second mole reacts with the acetylene bond so that the terminal carbon atom is made reactive. The di-magnesium halide compound or di-lithium compound formed is then reacted in the same solvent with the substituted $C_{19}$-aldehyde. The 4-hydroxy group in the nucleus of the $C_{19}$-aldehyde is conveniently protected against reaction by esterification, e. g. acetylation, thereof. The β- or iso-$C_{21}$-acetylene carbinol is preferably treated in a solvent, such as ether, with 2 moles of alkyl-magnesium halide, and the resulting di-magnesium halide compound is condensed, without preliminary isolation and purification, with 1 mole of the substituted β- or iso-$C_{19}$-aldehyde. The condensation product is preferably hydrolysed without any preliminary purification by conventional methods, e. g. by pouring it onto a mixture of ice and dilute sulphuric acid to obtain the mono-substituted $C_{40}$-diol. The mono-substituted diols are very viscous oils showing characteristic absorption maxima in the U. V. spectrum. They have two moles of active hydrogen atoms as determined by the method of Zerewitinoff.

According to a further mode of carrying out the first step of the process, the substituted β- or iso-$C_{19}$-aldehyde is first condensed in liquid ammonia with an alkali or alkaline earth acetylide, and the resulting substituted β- or iso-$C_{21}$-acetylene carbinol is reacted with β- or iso-$C_{19}$-aldehyde by a metal organic reaction. In this case it is convenient to use those substituted $C_{19}$-aldehydes which carry a free hydroxy group in the 4-position of the nucleus. The resulting substituted $C_{21}$-acetylene carbinols are then condensed as described hereinabove with β- or iso-$C_{19}$-aldehyde by using an excess of the Grignard reagent to obtain the corresponding mono-substituted $C_{40}$-diols.

In the second step of the process of the present invention the mono-substituted $C_{40}$-diol, if desired after having been esterified, is subjected to a treatment causing the elimination of two molecules of water or acid with allyl rearrangement. This reaction can be carried out, e. g., by treating the $C_{40}$-diol in which one of the nuclei carries an esterified hydroxy group with phosphorus oxychloride in an inert solvent in the presence of excess pyridine, or by heating the mono-substituted $C_{40}$-diol with a strong organic acid, such as p-toluenesulphonic acid, in toluene. The allyl rearrangement and the splitting off of water or acid can be made to take place simultaneously, e. g. by subjecting the mono-substituted $C_{40}$-diol to the action of aqueous or anhydrous hydrohalic acid. Conveniently, the mono-substituted $C_{40}$-diol is first esterified, e. g. by treating it with an acid anhydride or halide in the presence of a tertiary organic base, such as pyridine, and then the esterified product is subjected to a treatment causing splitting off of two molecules of acid. A suitable mode of carrying out this process step consists in treating a solution of the mono-substituted $C_{40}$-diol or of an ester thereof in an inert solvent, such as ether, methylene chloride or dioxane, with anhydrous hydrohalic acid. A small amount of acid is sufficient if the reaction is accelerated by heating. It is advantageous to effect the reaction in ethyl ether and to use an excess of alcoholic hydrochloric acid. Another suitable mode of operation consists in treating the $C_{40}$-diol or an ester thereof in a halogenated hydrocarbon solvent having a high dipole moment with aqueous hydrohalic acid at a temperature below 0° C. and splitting off hydrogen halide from the resulting halo compound by the action of water or of a basic compound. Solvents which may be used for this purpose include methylene chloride and chloroform, and concentrated aqueous hydrobromic acid may be used as the aqueous hydrohalic acid. There is thus obtained 15,15'-dehydro-β-carotene in which one of the nuclei carries a substituent in the 4-position [15,15'-dehydro-cryptoxanthene or esters thereof] which can be purified by distribution between solvents, chromatography or crystallisation. The esters of 15,15'-dehydro-cryptoxanthene can be saponified to 15,15'-dehydro-cryptoxanthene which can then be reconverted into esters thereof by esterification. The saponification is carried out in a manner known per se, e. g. by treatment with alkali metal hydroxides, carbonates or bicarbonates at room temperature or at elevated temperature in the presence of a diluent. The esterification is carried out by conventional methods, e. g. by treatment with acid halides or acid anhydrides in the presence of a tertiary organic base such as pyridine.

The products of the present process are crystalline compounds having absorption maxima in the ultra-violet spectrum at 430 and 458 mµ in petroleum ether. They are valuable intermediates for the synthesis of cryptoxanthene and esters thereof. Thus, 15,15'-dehydro-cryptoxanthene or its esters can be partially hydrogenated at the triple bond and isomerised by heating the hydrogenated product in an inert solvent to form cryptoxanthene or esters thereof. Cryptoxanthene as well as its esters are natural lipo-soluble dyestuffs.

The processes described above can be represented by the following flow sheets, wherein R represents hydroxy or lower alkanoyloxy. Flow Sheet I represents a process starting from β-$C_{19}$-aldehyde (compound Ia), on the one hand, and 4-R-β-$C_{19}$-aldehyde (compound Ib), on the other hand. Flow Sheet II represents a process starting from iso-$C_{19}$-aldehyde (compound IIa), on the one hand, and 4-R-iso-$C_{19}$-aldehyde (compound IIb) on the other hand. Flow Sheet III represents a process starting from β-$C_{19}$-aldehyde (compound Ia) and 4-R-iso-$C_{19}$-aldehyde (compound IIb). Flow Sheet IV represents a process starting from iso-$C_{19}$-aldehyde (compound IIa) and 4-R-β-$C_{19}$-aldehyde (compound Ib).

The invention will now be illustrated by the following example, however without being limited thereto.

FLOW SHEET I
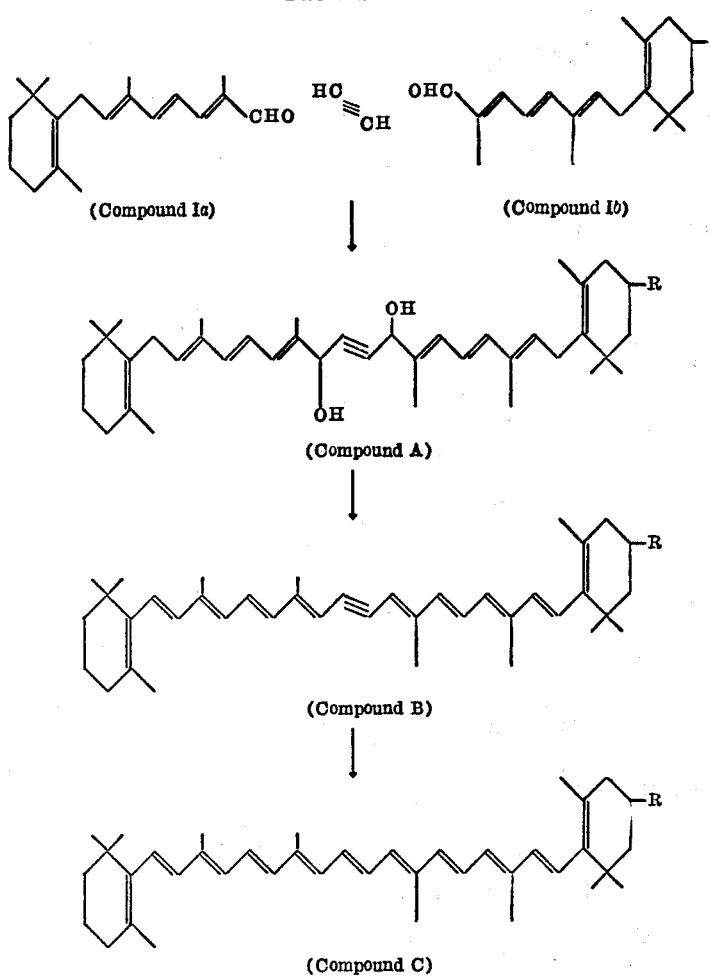
FLOW SHEET II
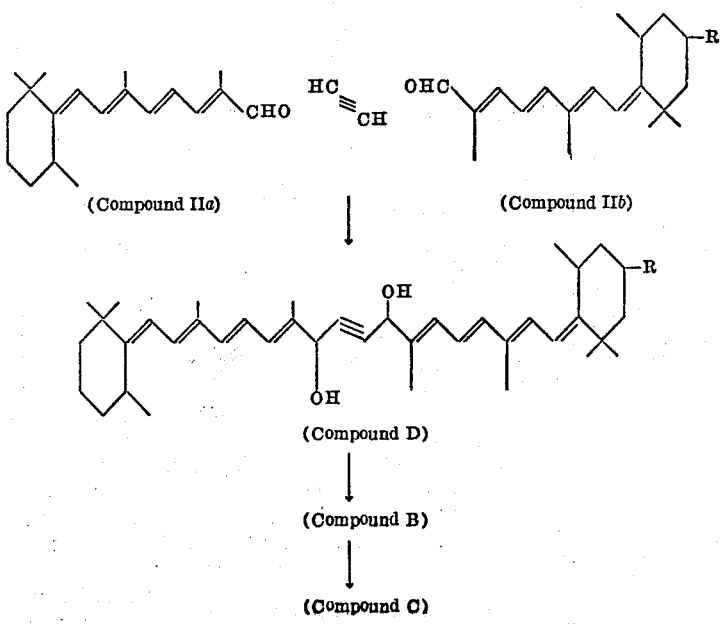

FLOW SHEET III

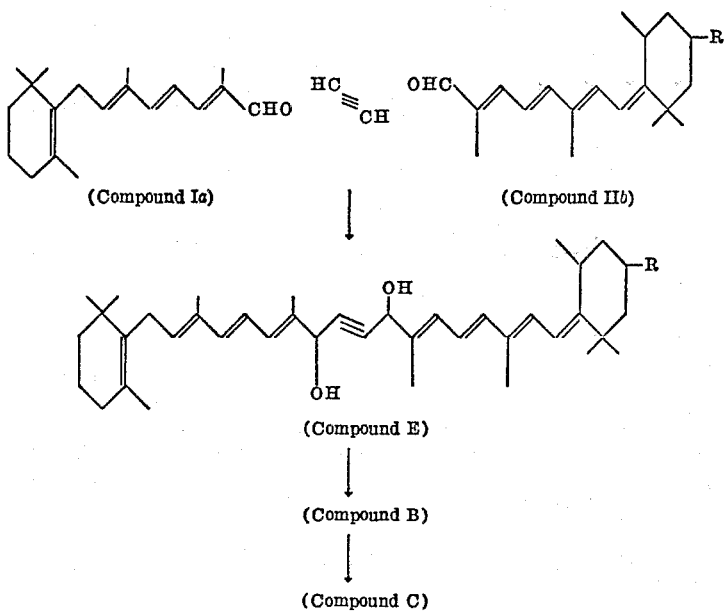

FLOW SHEET IV

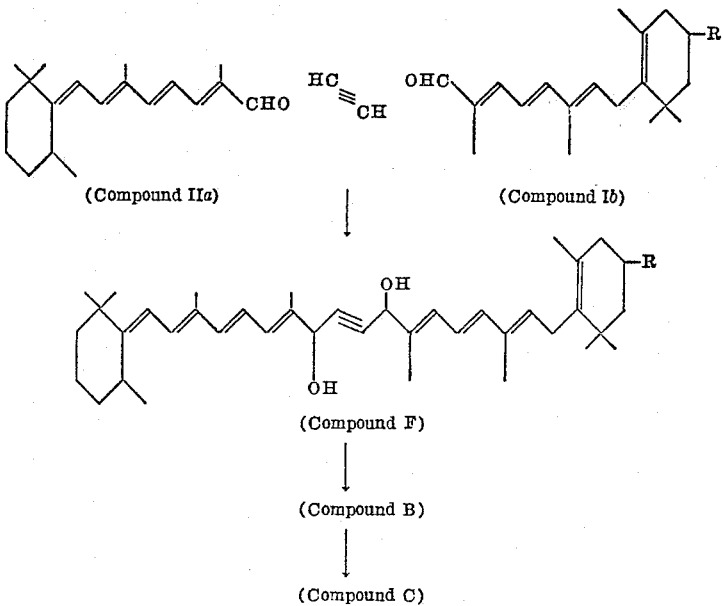

EXAMPLE

Dry, acetone-free acetylene was passed into a solution of 0.85 g. of lithium in 400 ml. of liquid ammonia until the lithium was completely reacted. Then there was added to the solution within 20 minutes, while stirring vigorously, a solution of 27.8 g. of 8-[2,6,6-trimethyl-1-cyclohexene - 1 - yl] - 2,6 - dimethyl - 2,4,6 - octatrien - 1-al in 100 ml. of dry ether, and the reaction mixture was vigorously stirred for 20 hours with exclusion of humidity. Then 16 g. of ammonium chloride were added in small portions, and the ammonia was allowed to evaporate. After addition of 120 ml. of water the ether layer was separated. The residual reddish oil was then sharply dried in vacuo. There were thus obtained 30 g. of 10-[2,6,6 - trimethyl - 1 - cyclohexen - 1 - yl] - 4,8 - dimethyl-4,6,8 - decatrien - 1 - yne - 3 - ol; U. V. absorption maxima at 280.5 and 291 mµ (in petroleum ether). This product was dissolved in 200 ml. of absolute ether, and the solution was added dropwise to a solution of ethyl-magnesium bromide (prepared from 5 g. of magnesium and 20 ml. of ethyl bromide in 200 ml. of absolute ether), while cooling with ice. The mixture was then refluxed for 1 hour, while stirring, in a nitrogen atmosphere. Then 27 g. of 8-[2,6,6-trimethyl - 4 - acetoxy - 1 - cyclohexen - 1 - yl] - 2,6 - dimethyl-2,4,6-octatrien-1-al in 200 ml. of absolute benzene were rapidly added, while vigorously stirring, and the mixture was refluxed for 3 hours. The reaction mixture was then poured into ice water containing a small amount of dilute sulfuric acid, and the upper layer was washed with water, dilute sodium bicarbonate solution and water. After drying and evaporation of the solvent the resulting crude 1 - [2,6,6 - trimethyl - 1 - cyclohexen - 1 - yl] - 18 - [2,6,6-trimethyl - 4 - acetoxy - 1 - cyclohexen - 1 - yl] - 3,7,12,16-tetramethyl - 8,11 - dihydroxy - 2,4,6,12,14,16 - octadeca-hexaen-9-yne was dissolved in 1050 ml. of methylene chloride and 40 ml. of acetic acid. Then 41 ml. of 60% hydrobromic acid were added to the solution within 20 seconds at minus 40° C., the mixture was vigorously stirred for 1½ minutes at minus 35° C., then 1050 ml. of water were added, and the mixture was stirred for 3 hours at 0–3° C. The methylene chloride solution was then washed neutral with water, dried over sodium sulfate and concentrated. The residue was shaken for 12 hours with 600 ml. of methanol, 400 ml. of ether and 60 ml. of potassium hydroxide in a nitrogen atmosphere. Then the reaction mixture was diluted with 3000 ml. of water and 400 ml. of ether, and the ethereal solution was washed neutral with water. The crude 15,15'-dehydro-cryptoxanthene (U. V. absorption maxima at 430 and 458 mµ) obtained by drying the ethereal solution and evaporation of the ether was purified by chromatography on 100 times its weight of alumina (according to Brockmann, activity state II) and recrystallised from methylene chloride-methanol or petroleum ether.

The 8 - [2,6,6 - trimethyl - 4 - acetoxy - 1 - cyclohexen-1 - yl] - 2,6 - dimethyl - 2,4,6 - hexadien - 1 - al required as a starting material in this example can for instance be obtained according to the following procedure:

138 g. of 2,6,6-trimethyl-1-cyclohexen-4-one [which can be made, for example, from isophorone by known procedures; compare Karash, Journal of the American Chemical Society, 63, 2308 (1941)] in 50 ml. of glacial acetic acid were stirred for two hours at 0–10° C. with 160 ml. of peracetic acid (containing 530 mg. of peracetic acid per ml.), and the mixture was allowed to stand overnight at 20° C. Then, while adding ice, the reaction mixture was made weakly alkaline (pH about 8) by adding 30% aqueous NaOH solution, and the reaction mixture was shaken for one hour at 20° C. Then the mixture was extracted twice, each time with 800 ml. of diethyl ether, and the ether solutions were washed once with 200 ml. of saturated ammonium chloride solution. The ether solutions were combined and dried over sodium sulfate, the solvent was driven off, and the residue was distilled in high vacuum. A forerun passed over between 70 and 80° C., and then 2,6,6 - trimethyl - 2 - cyclohexen - 1 - ol - 4 - one was obtained as an almost colorless oil having B. P. 110–112° C./0.1 mm., $n_D^{20}=1.501$, U. V. maximum at 226 mµ ($E_1^1=1110$ in petroleum ether solution), after standing for some time. The phenylsemicarbazone had M. P. 189–190° C., U. V. maxima at 240.5 mµ and 285 mµ ($E_1^1=807$ and 778 in ethanol).

To 154 g. of 2,6,6-trimethyl-2-cyclohexen-1-ol-4-one in 200 ml. of glacial acetic acid and 500 ml. of water was quickly added dropwise 70 g. of chromic anhydride in 200 ml. of water, while stirring and cooling, so that the temperature did not rise above 30° C. The mixture was then stirred over night at 20° C. Then the reaction mixture was saturated with ammonium chloride and was extracted with 1000 ml. of petroleum ether (boiling range 30–60° C.). The aqueous layer was again extracted in a second separatory funnel with 500 ml. of petroleum ether. The petroleum ether solutions were washed with saturated ammonium chloride solution to which a little ammonia had been added, and then with pure saturated ammonium chloride solution. The washed extracts were dried over sodium sulfate and the solvent was driven off. The product, 2,6,6-trimethyl-2-cyclohexene-1,4-dione, was distilled under a water pump vacuum; B. P. 92–94° C./11 mm., a yellow oil which solidified to crystalline form in the refrigerator, $n_D^{21}=1.490$, U. V. maximum at 238 mµ ($E_1^1=942$ in petroleum ether). The phenylsemicarbazone had M. P. 190° C., then resolidified and melted again at 230° C., U. V. maxima at 242.5 mµ and 325.5 mµ ($E_1^1=875$ and 580 in ethanol).

65 g. of 2,6,6-trimethyl-2-cyclohexene-1,4-dione in 250 ml. of glacial acetic acid was slowly reacted with 130 g. of zinc dust, while stirring, so that the temperature did not rise above 50° C. Then the reaction mixture was stirred for an additional period of one hour. The reaction mixture was filtered, diluted with 1000 ml. of water and then saturated with ammonium chloride. The mixture was extracted twice, each time with 800 ml. of petroleum ether (boiling range 30–60° C.). The petroleum ether solutions were washed with 300 ml. of saturated ammonium chloride solution to which some ammonia was added, and then were washed with pure saturated ammonium chloride solution. (In case a portion of the product crystallizes from the petroleum ether solution, it is filtered off, the crystalline material is dissolved in diethyl ether, then the diethyl ether solution is washed as indicated above, dried over sodium sulfate and then combined with the petroleum ether solution.) The solvent was driven off until the product, 2,6,6-trimethyl-1,4-cyclohexanedione, started to crystallize out; colorless needles, M. P. 63–65° C., having no absorption maximum in the ultraviolet spectrum between 220 and 280 mµ. The phenylsemicarbazone had M. P. 218–220° C., U. V. maximum at 250 mµ ($E_1^1=1030$ in ethanol).

34.6 of 2,6,6-trimethyl-1,4-cyclohexanedione, 100 ml. of benzene, 19 g. of ethylene glycol and 0.2 g. of p-toluenesulfonic acid were refluxed for seven hours while separating the water which was formed. Upon cooling, the reaction mixture was poured into 300 ml. of 5% sodium bicarbonate solution, and the 2,6,6-trimethyl-4-ethylenedioxy-1-cyclohexanone product was obtained by extraction with diethyl ether and distillation of the extract. The product was obtained as a colorless oil, having B. P. 70° C./0.02 mm., $n_D^{21}=1.469$.

To a lithium amide suspension prepared by dissolving 6.7 g. of lithium in 2000 ml. of liquid ammonia was added slowly, while stirring, 52 g. of 1-methoxy-2-methyl-3-butyn-2-ol. The mixture was stirred for one hour and then 79 g. of 2,6,6-trimethyl-4-ethylenedioxy-1-cyclohexanone was added, and the reaction mixture was stirred overnight at the boiling temperature of the ammonia. 60 g. of ammonium chloride was added and then the ammonia was driven off. The residue was taken up in diethyl ether, and insoluble material was filtered off; the ether solution was washed with a saturated solution of ammonium chloride, then was dried over sodium sulfate, and the ether was driven off. The residue was suspended in 450 ml. of petroleum ether and was extracted four times, each time with 300 ml. of 70% methanol. The methanol extracts were washed three times, each time with 150 ml. of petroleum ether, then were diluted with saturated ammonium chloride solution and the precipitated material was taken up in diethyl ether. The ether solution was washed with water, dried over sodium sulfate, and the ether was driven off. There was thus obtained 92 g. of 4-(2,6,6-trimethyl-4-ethylenedioxy-1-hydroxy-1-cyclohexyl)-2-methyl-1-methoxy-3-butyn-2-ol as yellow, viscous oil.

92 g. of the latter was dissolved in 3000 ml. of dry diethyl ether, was mixed while stirring at 0–5° C. with a solution of 22.5 g. of lithium aluminum hydride in 300 ml. of dry diethyl ether, and the reaction mixture was refluxed for four hours. Then the reaction mixture was cooled with ice, 250 ml. of methanol was added slowly while stirring at 0–5° C., and the clear solution was poured into a mixture of 100 g. of ice and 600 ml. of saturated ammonium chloride solution. The precipitated aluminum hydroxide was filtered off and the precipitate was washed with diethyl ether and added to the filtrate. The combined liquors were washed with water, dried over sodium sulfate and the solvents were driven off. The residue was partitioned between petroleum ether and 70% methanol, in the manner indicated above, and from the methanol extracts there was obtained 70 g. of 4-(2,6,6-trimethyl-4-ethylenedioxy-1-hydroxy-1-cyclohexyl)-2-methyl-1-methoxy-3-buten-2-ol as a light yellow, viscous oil.

70 g. of the latter was mixed with 140 ml. of formic acid and the mixture was heated for 25 minutes at 100° C. The reaction mixture was poured onto ice and extracted with diethyl ether, the ethereal solution was washed with water and with dilute sodium bicarbonate solution, dried over sodium sulfate, and the ether was driven off. The residue was dissolved in 200 ml. of glacial acetic acid. 26 ml. of water and 32 g. of sodium acetate were added, and the mixture was heated at 95° C.

for two hours. Then it was diluted with ice water, and was extracted with diethyl ether, the ether extract was washed with water and with dilute sodium bicarbonate solution, dried over sodium sulfate and the ether was driven off. The residue was distilled in vacuum, thereby yielding 4-(2,6,6-trimethyl-4-oxo-1-cyclohexylidene)-2-methyl-2-buten-1-al as a yellow oil having B. P. ca. 110° C./0.02 mm., $n_D21=1.555$ (U. V. maximum at 284 m$\mu$ in petroleum ether).

A solution of 31 g. of 4-(2,6,6-trimethyl-4-oxo-1-cyclohexylidene)-2-methyl-2-buten-1-al in 34 ml. of orthoformic acid ethyl ester and 7 ml. of absolute ethanol was mixed with 0.65 ml. of orthophosphoric acid and 0.05 g. of p-toluene-sulfonic acid, and the mixture was allowed to stand for 24 hours at room temperature. 7 ml. of pyridine was added then the mixture was poured upon ice and dilute sodium bicarbonate solution, the resulting mixture was extracted with petroleum ether, the petroleum ether extract was washed with water, dried over sodium sulfate, the solvent was driven off and the residue was dried in vacuo at 60° C. There was thus obtained 40 g. of 4-(2,6,6-trimethyl-4-oxo-1-cyclohexylidene)-2-methyl-1,1-diethoxy-2-butene (U. V. maximum at 248 m$\mu$ in petroleum ether).

40 g. of the latter product was dissolved in 600 ml. of dry diethyl ether and was mixed slowly, while stirring at 0.5° C., with a solution of 2.8 g. of lithium aluminum hydride in 40 ml. of diethyl ether. The reaction mixture was stirred for one hour at room temperature, then was cooled to 0–5° C.; 20 ml. of methanol was added slowly, and the reaction mixture was poured upon ice and saturated ammonium chloride solution. The precipitated aluminum hydroxide was filtered off and washed with diethyl ether, the ether was added to the filtrate, the combined liquors were dried over sodium sulfate and the solvent material was driven off. There was obtained 39.5 g. of 4-(2,6,6-trimethyl-4-hydroxy-1-cyclohexylidene)-2-methyl-1,1-diethoxy-2-butene.

39.5 g. of the latter was acetylated by mixing it with 40 ml. of pyridine and 20 ml. of acetic anhydride and permitting the mixture to stand for 20 hours. The reaction mixture was poured into ice water, extracted with petroleum ether, the organic layer was washed with cold sodium bicarbonate solution, dried over sodium sulfate and the solvent was driven off, yielding 42 g. of 4 - (2,6,6 - trimethyl - 4 - acetoxy - 1 - cyclohexylidene) - 2 - methyl - 1,1 - diethoxy - 2 - butene.

42 g. of the latter was mixed with 400 ml. of glacial acetic acid, 50 ml. of water and 65 g. of sodium acetate and heated at 95° C. for three hours. Then the reaction mixture was diluted with ice water and was extracted with diethyl ether. The ethereal solution was washed several times with water, dried over sodium sulfate and the ether was driven off. There was thus obtained 31 g. of 4 - (2,6,6 - trimethyl - 4 - acetoxy - 1 - cyclohexylidene) - 2 - methyl - 2 - buten - 1 - al (U. V. maximum at 284 m$\mu$ in petroleum ether).

31 g. of 4 - (2,6,6 - trimethyl - 4 - acetoxy - 1 - cyclohexylidene) - 2 - methyl - 2 - buten - 1 - al was dissolved in 40 ml. of toluene, mixed with 16 g. of isopropenyl acetate and 0.2 g. of p-toluenesulfonic acid and the mixture was heated at 120–140° C. while continuously removing the acetone which was formed. After approximately two hours, the reaction mixture was cooled down, poured into ice water and extracted with petroleum ether. The petroleum ether solution was washed with cold sodium bicarbonate solution and then with water, dried over sodium sulfate and the solvent was distilled off. There was thus obtained 34 g. of 4 - (2,6,6 - trimethyl - 4 - acetoxy - 1 - cyclohexen - 1 - yl) - 2 - methyl - 1 - acetoxy - 1,3 - butadiene (U. V. maximum at 262 m$\mu$ in petroleum ether).

34 g. of the latter was dissolved in 750 ml. of methanol, mixed with 75 ml. of water and 27 g. of sodium bicarbonate and the mixture was refluxed for six hours while stirring. Then the reaction mixture was diluted with ice water, extracted with diethyl ether, the ether solution was washed with water, dried over sodium sulfate and the ether was driven off. In order to insure acetylation of the nuclear hydroxy group, the residue, presumably containing at least some 4 - (2,6,6 - trimethyl - 4 - hydroxy - 1 - cyclohexen - 1 - yl) - 2 - methyl - 2 - buten - 1 - al, was mixed with 60 ml. of pyridine and 30 ml. of acetic anhydride and the mixture was allowed to stand for 20 hours at room temperature. 100 ml. of ice water was added and the mixture was then extracted with diethyl ether. The ethereal solution was washed with cold sodium bicarbonate solution and then with water, dried over sodium sulfate and the solvent was driven off. The 4 - (2,6,6 - trimethyl - 4 - acetoxy - 1 - cyclohexen - 1 - yl) - 2 - methyl - 2 - buten - 1 - al thus obtained can be purified by chromatography and partitioning between solvents: U. V. maximum at 232 m$\mu$ in ethanol.

7.3 g. of 4 - [2,6,6 - trimethyl - 4 - acetoxy - cyclohexen - (1) - yl] - 2 - methyl - buten - (2) - al - (1) were treated in the manner described above. There were thus obtained 6.8 g. of 6 - [2,6,6 - trimethyl - 4 - acetoxy - cyclohexen - (1) - yl] - 4 - methylhexadien - (2,4) - al - (1) in the form of a viscous, yellowish oil; U. V. absorption maximum at 273–275 m$\mu$ (in petroleum ether solution). The phenyl semicarbazone of the obtained aldehyde, crystallised from ethyl acetate in almost colorless needles (M. P. 190° C.); U. V. absorption maxima at 234 and 304 m$\mu$ (in petroleum ether).

To a solution of 4.5 g. of 6 - [2,6,6 - trimethyl - 4 - acetoxy - 1 - cyclohexen - 1 - yl] - 4 - methyl - 2,4 - hexadien - 1 - al in 4 ml. of ethyl ortho-formate there was added a mixture of 0.75 ml. of absolute alcohol and 0.075 g. of ortho-phosphoric acid, and after the addition of 0.003 g. of p-toluenesulfonic acid the reaction mixture was allowed to stand at room temperature for 24 hours. Then 1 ml. of pyridine was added, and the reaction mixture was poured into a mixture of 100 g. of 5% sodium bicarbonate solution and 10 g. of ice. The product was extracted with ether, and the ether solution was washed with water. After drying of the ether solution over sodium sulfate and evaporation of the ether, the residue was freed from excess ethyl ortho-formate in a high vacuum at 50° C. There were thus obtained 4.85 g. of acetal; U. V. absorption maxima at 286.5 and 297.5 m$\mu$ in petroleum ether solution. The acetal was dissolved, without any further purification, in 7 ml. of absolute benzene, 1 ml. of a 10% solution of zinc chloride in ethyl acetate was added to the solution, and then 1.2 g. of propenyl ethyl ether in 2 ml. of absolute benzene were added dropwise, while stirring and maintaining the temperature below 30° C. The reaction mixture was then further stirred over night at room temperature. The benzene was then removed at 30° C. in the vacuum of a water jet pump, and 20 ml. of glacial acetic acid, 1 ml. of water and 2 g. of sodium acetate were added to the residue. The mixture was heated at 95° C. for 3 hours in a carbon dioxide atmosphere. After cooling, the solution was poured into 200 ml. of water, and the reaction product was extracted with ether. The ether solution was washed several times with water and then with dilute sodium bicarbonate solution. Upon drying of the ether solution over sodium sulfate and evaporation of the ether, there were obtained 4.5 g. of 8 - [2,6,6 - trimethyl - 4 - acetoxy - 1 - cyclohexen - 1 - yl] - 2,6 - dimethyl - 2,4,6 - octatrien - 1 - al in the form of a yellow oil; U. V. absorption maximum at 310 m$\mu$ (in petroleum ether solution). This product can be purified by chromatography on alumina (according to Brockmann, activity state II). The phenylsemicarbazone of this aldehyde melted at 192–193° C., after recrystallisation;

$$E^{1\%}_{1\,cm.} = 355$$

at 232 m$\mu$; 1575 at 332 m$\mu$; and 1505 at 346 m$\mu$.

We claim:

1. A compound selected from the group consisting of 15,15'-dehydro-cryptoxanthene and lower alkanoylated 15,15'-dehydro-cryptoxanthene.

2. 15,15'-dehydro-cryptoxanthene acetate.

3. A compound selected from the group consisting of 1 - Q - 18 - T - 3,7,12,16 - tetramethyl - 8,11 - dihydroxy - 2,4,6,12,14,16 - octadecahexaen - 9 - ynes wherein Q represents a member selected from the group consisting of 2,6,6 - trimethyl - 1 - cyclohexen - 1 - yl and 2,6,6 - trimethyl - cyclohexylidene radicals and T represents a member selected from the group consisting of 2,6,6 - trimethyl - 4 - R - 1 - cyclohexen - 1 - yl and 2,6,6 - trimethyl - 4 - R - cyclohexylidene radicals in which R represents a member selected from the group consisting of hydroxy and lower alkanoyloxy groups.

4. 15,15'-dehydrocryptoxanthene.

References Cited in the file of this patent

UNITED STATES PATENTS

| | | |
|---|---|---|
| 2,671,112 | Inhoffen et al. | Mar. 2, 1954 |
| 2,730,549 | Isler et al. | Jan. 10, 1956 |

UNITED STATES PATENT OFFICE

CERTIFICATE OF CORRECTION

Patent No. 2,819,297                              January 7, 1958

Otto Isler et al.

It is hereby certified that error appears in the printed specification of the above numbered patent requiring correction and that the said Letters Patent should read as corrected below.

Column 2, line 43, for "methanol," read -- methanol. --; column 3, line 3, for "8[ " read -- 8-[ --; line 14, for "cyclohexene" read -- cyclohexen --; column 4, lines 74 and 75, strike out the paragraph reading "The invention will now be illustrated by the following example, however without being limited thereto."

and insert the same in column 7, above the heading "EXAMPLE" in line 55; same column 7, line 61, for "cyclohexene" read -- cyclohexen --; column 11, line 14, for "p-toluene-sulfonic" read -- p-toluenesulfonic --; line 16, for "added then" read -- added and then --; line 27, for "0.5⁶ C." read -- 0-5° C. --.

Signed and sealed this 18th day of March 1958.

(SEAL)
Attest:

KARL H. AXLINE                                       ROBERT C. WATSON
Attesting Officer                                    Commissioner of Patents